(12) United States Patent
Choo et al.

(10) Patent No.: US 7,696,529 B2
(45) Date of Patent: Apr. 13, 2010

(54) ARRAY SUBSTRATE FOR USE IN A TRANSFLECTIVE LIQUID CRYSTAL DISPLAY DEVICE AND A METHOD OF FABRICATING THE SAME

(75) Inventors: Kyo-Seop Choo, Seoul (KR); Ki-Bok Park, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1872 days.

(21) Appl. No.: 09/878,284

(22) Filed: Jun. 12, 2001

(65) Prior Publication Data

US 2001/0052952 A1 Dec. 20, 2001

(30) Foreign Application Priority Data

Jun. 13, 2000 (KR) .............................. 2000-32528

(51) Int. Cl.
*G02F 1/1333* (2006.01)
(52) U.S. Cl. .................. 257/114; 257/459; 257/774; 438/48; 438/637
(58) Field of Classification Search ............... 349/43, 349/46, 113, 114; 257/459, 774; 438/48, 438/637
See application file for complete search history.

(56) References Cited

U.S. PATENT DOCUMENTS 5,208,690 A * 5/1993 Hayashi et al. ............. 349/143
6,400,030 B1 * 6/2002 Wang et al. ................. 257/774

FOREIGN PATENT DOCUMENTS

| JP | 06075238 A | * | 3/1994 |
| JP | 10-048667 | | 2/1998 |
| JP | 11-218751 | | 8/1999 |

* cited by examiner

*Primary Examiner*—Matthew E Warren
(74) *Attorney, Agent, or Firm*—Morgan Lewis & Bockius LLP (57) ABSTRACT

The present invention provides a transflective liquid crystal display device having at least one switching element having at least a drain electrode, a first passivation layer formed over the switching element with the first passivation layer defining a drain contact hole exposing a first portion the drain electrode, a transparent pixel electrode contacting the drain electrode through the drain contact hole and defining a contact opening that exposes a second portion of the drain electrode, the contact opening being defined in a portion of the transparent pixel electrode in the drain contact hole, and a reflective pixel electrode contacting the transparent pixel electrode in the drain contact hole and contacting the drain electrode through the contact opening.

27 Claims, 9 Drawing Sheets

ARRAY SUBSTRATE FOR USE IN A TRANSFLECTIVE LIQUID CRYSTAL DISPLAY DEVICE AND A METHOD OF FABRICATING THE SAME

This application claims the benefit of Korean Patent Application No. 2000-32528, filed in Korea on Jun. 13, 2000, the entirety of which is hereby incorporated by reference.

BACKGROUND OF THE INVENTION

1. Field of the Invention

The present invention relates to a transflective liquid crystal display (LCD) device. And more particularly, it relates to an array substrate for use in a transflective LCD, which is used in a transmissive mode or/and a reflective mode.

2. Description of the Related Art

The cathode-ray tube (CRT) was developed and is mainly used for display systems. However, flat panel displays are beginning to be incorporated into display systems because of their small dimension, low weight and low voltage power consumption. Presently, thin film transistor-liquid crystal displays (TFT-LCD) having a high resolution are being developed.

In general, LCD devices have various advantages in that, for example, they are relatively thin and require low power for operation, when compared to CRT display devices. Therefore, such LCD devices are good candidates to replace CRT display devices and have been a matter of great interest in a variety of technical fields.

The LCD devices are generally divided into three types: transmissive LCD devices; reflective LCD devices; and transflective LCD devices. The transmissive LCD device utilizes a back light device as a light source, while the reflective LCD device utilizes ambient light instead of a back light device. The transflective LCD device has both transmissive and reflective modes.

The transflective liquid crystal display (LCD) device selectively acts as the transmissive LCD device and as the reflective LCD device. Due to the fact that a transflective LCD device can make use of both internal and external light sources, it can operate in bright ambient light utilizing low power consumption.

Figure 1:
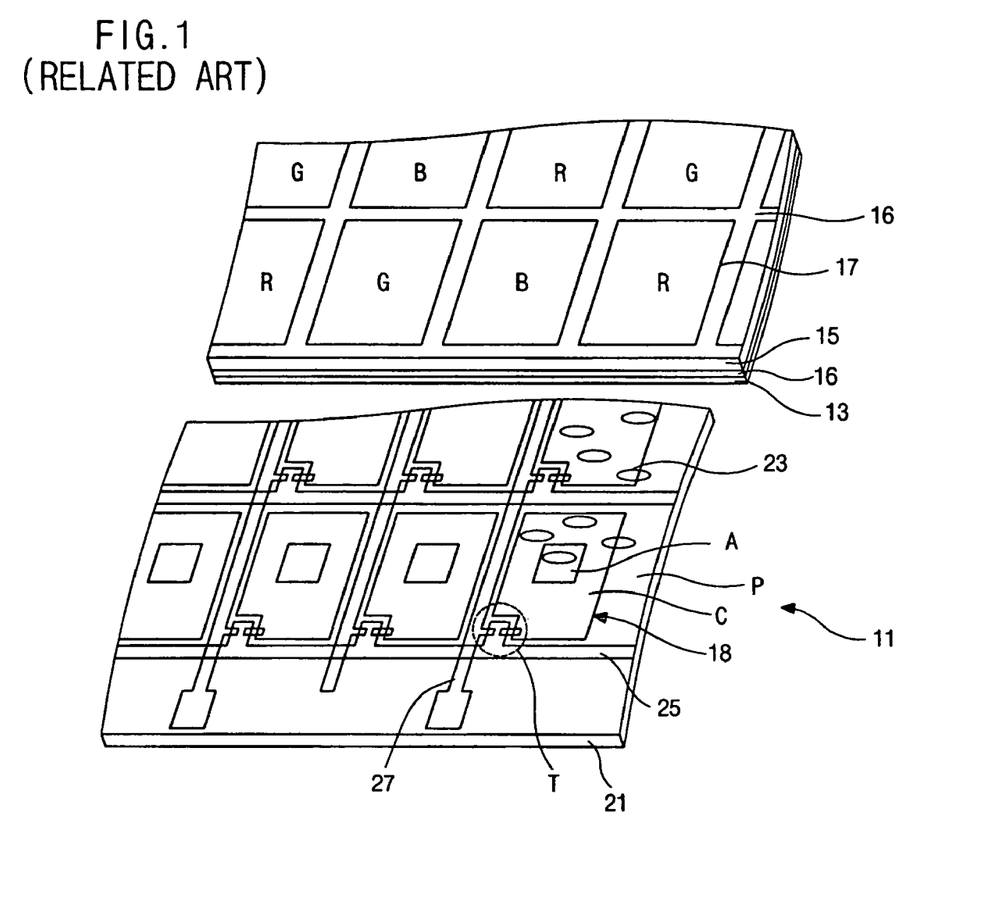
FIG. 1 shows a typical transflective liquid crystal display (LCD) device.

FIG. 1 shows a typical transflective liquid crystal display (LCD) device 11. The transflective LCD device 11 includes upper and lower substrates 15 and 21 with a liquid crystal 23 interposed therebetween. The upper 15 and lower 21 substrates are sometimes referred to as a color filter substrate and an array substrate, respectively.

On a surface facing the lower substrate 21, the upper substrate 15 includes a black matrix 16 and a color filter layer 17. The color filter layer 17 includes a matrix array of red (R), green (G), and blue (B) color filters that are formed such that each color filter is bordered by the black matrix 16. The upper substrate 15 also includes a common electrode 13 positioned beneath the color filter layer 17 and the black matrix 16.

On a surface facing the upper substrate 15, the lower substrate 21 includes an array of thin film transistors (one of which being designated "T" in FIG. 1) that individually act as switching devices. The array of thin film transistors is formed to correspond with the matrix of color filters. A plurality of crossing gate lines 25 and data lines 27 are positioned such that a TFT is located near each crossing of the gate lines 25 and data lines 27. The lower substrate 21 also includes a plurality of pixel electrodes 18, each in an area defined between the gate lines 25 and the data lines 27. Such areas are often referred to as pixel regions "P."

Each pixel electrode 18 includes a transmitting portion "A" and a reflective portion "C". The transmitting portion "A" is usually formed from a transparent conductive material having good light transmissivity, for example, indium-tin-oxide (ITO) or indium-zinc-oxide (IZO). Alternatively, the transparent portion "A" can be a hole. Moreover, a conductive metallic material having a superior light reflectivity is used for the reflective portion "C".

Figure 2:
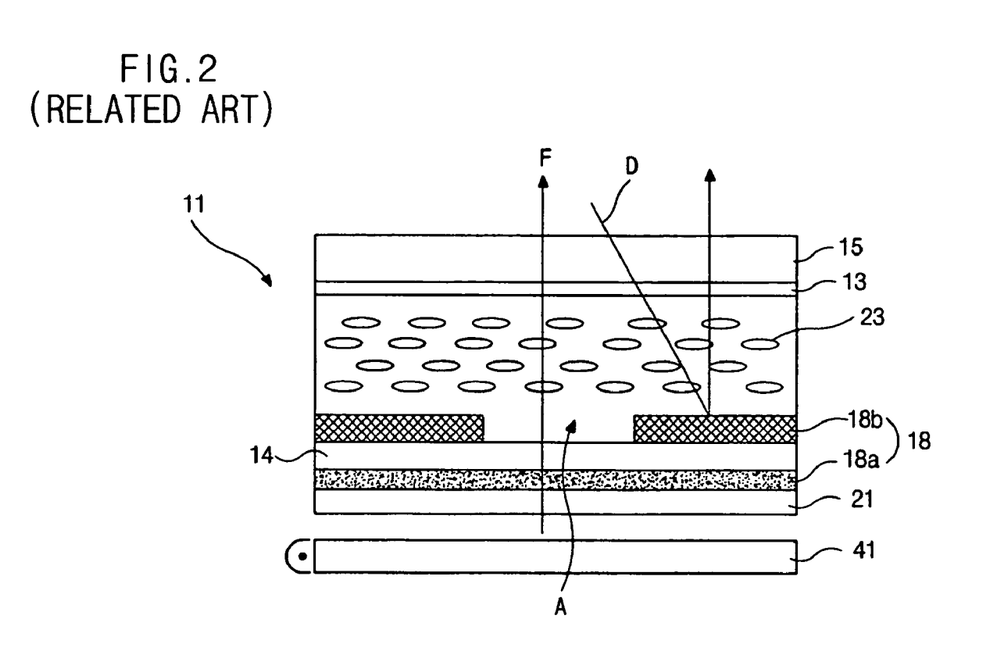
FIG. 2 is a schematic cross-sectional depiction of one pixel of the typical transflective LCD device.

FIG. 2 is a schematic cross-section of one pixel of the typical transflective LCD device 11 to facilitate an understanding of the operation of such devices. As shown in FIG. 2, the transflective LCD device 11 includes lower 21 and upper 15 substrates and a liquid crystal layer 23 interposed therebetween. The upper substrate 15 includes a common electrode 13. However, in FIG. 2 the color filter layer 17 and black matrix 16 (see FIG. 1) are not depicted because FIG. 2 shows just one pixel of the typical transflective LCD device, and the color filter layer 17 does not affect the polarization state of light. The lower substrate 21 includes a transparent electrode 18a formed thereupon. On the transparent electrode 18a, an insulation layer 14 is formed. A reflective electrode 18b having the transmitting portion "A", i.e., the hole, is formed on the insulation layer 14. The transparent 18a and reflective 18b electrodes function together as the pixel electrode 18. The transflective LCD device 11 also includes a backlight device 41.

The transflective LCD device 11 described above uses artificial light "F" generated from the backlight device 41 when operating in the transmissive mode, while the transflective LCD device 11 uses ambient light "D" from surroundings when operating in the reflective mode. Namely, as shown in FIG. 2, the transparent electrode 18a transmits light "F" irradiated from the backlight device 41, while the reflective electrode 18b reflects the ambient light "D."

The transflective LCD device 11 is operable in both the reflective mode and the transmissive mode. In the reflective mode, the ambient light "D" passes through the upper substrate 15 and is reflected from the reflective electrode 18b back toward the upper substrate 15. With an electrical signal applied between the common electrode 13 and the pixel electrode (reflective electrode 18b and transparent electrode 18a) by the switching element "T" (see FIG. 1), the phase of the liquid crystal layer 23 changes. Thus, the light "D" passing through the liquid crystal layer 23 is colored by the color filter (see reference element 17 of FIG. 1) and is displayed as a colored pixel.

In the transmissive mode, the light "F" from the backlight device 41 passes through the transparent electrode 18a. With an electrical signal applied between the common electrode 13 and to the pixel electrode (reflective electrode 18b and transparent electrode 18a) by the switching element "T" (see FIG. 1), the alignment state of the liquid crystal layer 23 changes. Accordingly, the light "F" passing through the liquid crystal layer 23 is colored by the color filter 17 (see FIG. 1) and is displayed as a colored pixel.

As described above, since the transflective LCD device 11 has both transmissive and reflective modes, the transflective LCD device can be used anytime, day or night. It also has the advantage of being battery powered for an extended time due its low power consumption.

Figure 3:
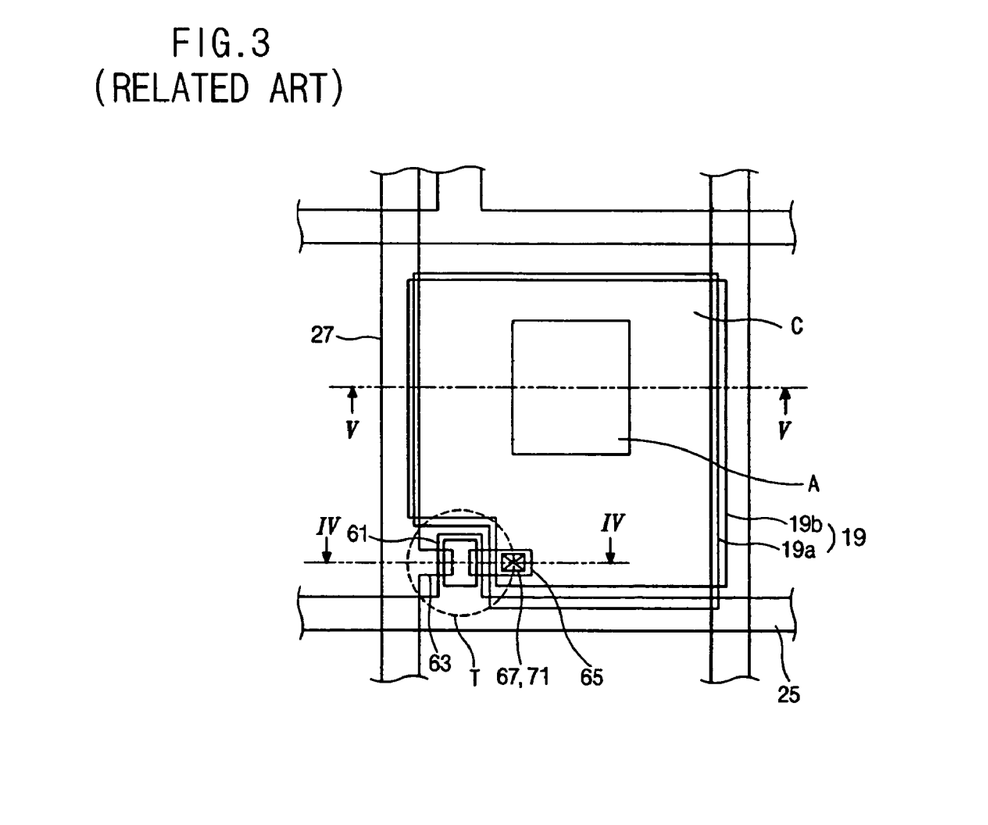
FIG. 3 is a plan view illustrating one pixel of an array substrate for a conventional transflective liquid crystal display device.

FIG. 3 is a plan view illustrating one pixel of an array substrate for a conventional transflective liquid crystal display device. As shown, gate lines 25 are arranged in a transverse direction, and data lines 27 are arranged in a longitudinal direction perpendicular to the gate lines 25. A thin film transistor (TFT) "T" is arranged at a crossover point of the gate lines 25 and the data lines 27. The TFT includes gate 61, source 63 and drain 65 electrodes. The gate electrode 61 extends from the gate line 25, and the source electrode 63 extends from the data line 27. The drain electrode 65 is spaced apart from the source electrode 63. A pixel electrode 19 is arranged on a region defined by the gate lines 25 and the data lines 27. The pixel electrode 19 includes a transparent pixel electrode 19a that is made of a transparent conductive material such as indium-tin-oxide (ITO) or indium-zinc-oxide (IZO), and a reflective pixel electrode 19b that is made of a reflective conductive material such as aluminum (Al) or Al-alloy (for example, AlNb). The transparent pixel electrode 19a is usually formed under the reflective pixel electrode 19b and contacts the drain electrode 65 through a first contact hole 67. The reflective pixel electrode 19b that is usually formed over the transparent pixel electrode 19a is divided into a transmitting portion "A", i.e., usually a hole, and a reflective portion "C." Through a second contact hole 71, the reflective pixel electrode 19b contacts the transparent pixel electrode 19a, and is electrically connected with the drain electrode 65.

Figure 4:
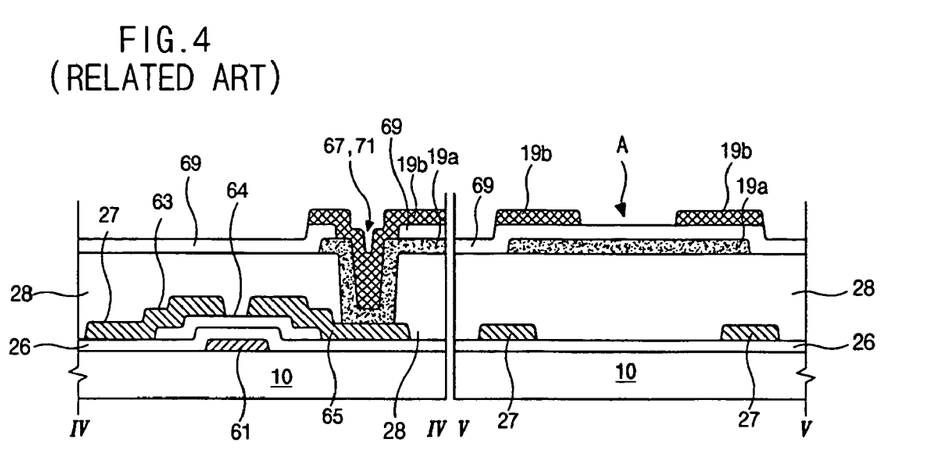
FIG. 4 is a cross sectional view taken along the lines IV-IV and V-V of FIG. 3, illustrates layer elements of the array substrate for use in the conventional transflective LCD device.

FIG. 4 is a cross sectional view taken along the lines IV-IV and V-V of FIG. 3, and illustrates layer elements of the array substrate for use in a conventional transflective LCD device. The manufacturing process of the array substrate of FIG. 3 will be briefly explained hereinafter.

In the first manufacturing step, the gate electrode 61 and the gate line (see reference element 25 of FIG. 3) are formed by depositing and patterning a first metal on a substrate 10. A gate insulation layer 26 is formed on the substrate 10 to cover the patterned first metal layer.

In the second manufacturing step, a semiconductor layer 64 is formed on the gate insulation layer 26, particularly over the gate electrode 61. The semiconductor layer 64 is comprised of an amorphous silicon layer (a-Si) and an impurity-doped amorphous silicon layer (n+/p+a-Si).

In the third manufacturing step, the source and drain electrodes 63 and 65 are formed on the semiconductor layer 64, and are made of the conductive metallic material selected from a group consisting of chromium (Cr), aluminum (Al), aluminum alloy (Al alloy), molybdenum (Mo), tantalum (Ta), tungsten (W), and antimony (Sb), and the like. By depositing and patterning these materials, not only are the source 63 and drain 65 electrodes formed, but the data line 27 is also formed on the gate insulation layer 26 such that the source electrode 63 is extends from the data line 27. The source 63 and drain 65 electrodes are spaced apart from each other and respectively overlap opposite ends of the gate electrode 61.

In the fourth manufacturing step, a first passivation layer 28 is then formed on and over the intermediates by depositing an organic or inorganic insulating material. After that, the first contact hole 67 that exposes a portion of the drain electrode 65 is formed by patterning the first passivation layer 28.

In the fifth manufacturing step, a transparent conductive material such as indium-tin-oxide (ITO) or indium-zinc-oxide (IZO) is deposited on the first passivation layer 28 having the first contact hole 67 and then patterned to form the transparent pixel electrode 19a. Accordingly, the transparent pixel electrode 19a contacts the portion of the drain electrode 65 through the first contact hole 67.

In the sixth manufacturing step, a second passivation layer 69 is deposited on the first passivation layer 28 to cover the transparent pixel electrode 19a, and then patterned to form the second contact hole 71 over the first contact hole 67. The second contact hole 71 exposes a portion of the transparent pixel electrode 19a over the drain electrode 65. When performing the patterning process to form the second contact hole 71, a photo mask used for forming the second contact hole 71 is the same mask as used for forming the first contact hole 67.

In the seventh manufacturing step, the reflective pixel electrode 19b is formed by depositing and patterning a reflective conductive material such as aluminum (Al) or Al-alloy (for example, AlNB) on the second passivation layer 69 having the second contact hole 71. Accordingly, the reflective pixel electrode 19b contacts the transparent pixel electrode 19a through the second contact hole 71, thereby electrically interconnecting with the drain electrode 65. When patterning the reflective conductive material, the transmitting portion "A" (i.e., the hole) is formed at a nearly central portion of the pixel region.

However, the structure of the array substrate mentioned above has some problems and is limited. The reflective pixel electrode 19b is usually made of aluminum-based material because of its low resistance and high light reflectivity. However, from this reason, the aluminum-based material is easily oxidized and thus converts to aluminum oxide ($Al_2O_3$).

Accordingly, aluminum oxide ($Al_2O_3$) comprises an oxidized layer in an interface between the transparent pixel electrode 19a and the reflective pixel electrode 19b. Moreover, due to the aluminum oxide ($Al_2O_3$), the contact resistance in the interface between the transparent 19a and reflective 19b pixel electrodes becomes higher thereby deteriorating operating characteristics of the device.

Figure 5:
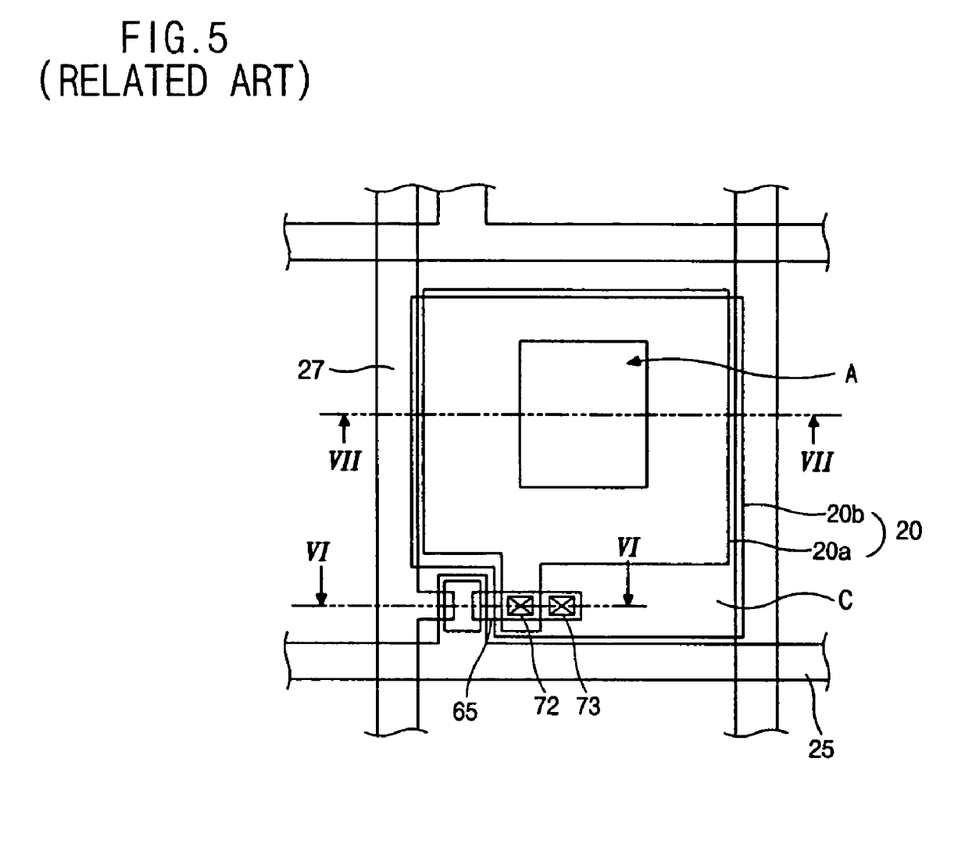
FIG. 5 is a plan view illustrating one pixel of an array substrate for another conventional transflective liquid crystal display device.
Figure 6:
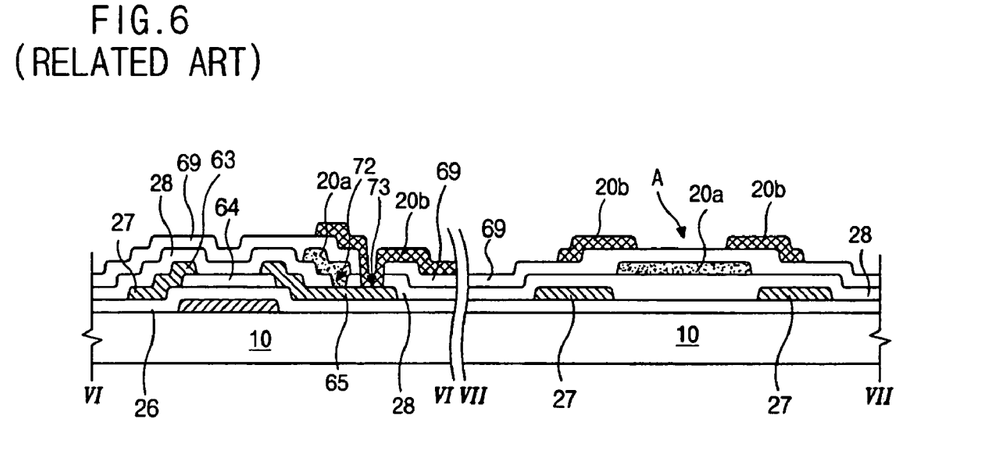
FIG. 6 is a cross sectional view taken along the lines VI-VI and VII-VII of FIG. 5, illustrates layer elements of the array substrate for use in another conventional transflective LCD device.

To overcome this problem, another structure is proposed as shown in FIGS. 5 and 6. FIG. 5 is a plan view illustrating one pixel of an array substrate for another conventional transflective liquid crystal display device. Although FIG. 5 is similar to FIG. 3, the array substrate of FIG. 5 has a different structure from that of FIG. 3, and thus the differences between them are explained hereinafter.

As shown in FIG. 5, a pixel electrode 20 includes a transparent pixel electrode 20a made of a transparent conductive material such as indium-tin-oxide (ITO) or indium-zinc-oxide (IZO), and a reflective pixel electrode 20b made of a reflective conductive material such as aluminum (Al) or Al-alloy (for example, AlNb), much as the pixel electrode 19 of FIG. 3. However, the transparent pixel electrode 20a is smaller in size than the reflective pixel electrode 20b, and has a protrusion that overlaps the drain electrode 65. This protrusion makes contact with the drain electrode 65 through a first contact hole 72. The transparent pixel electrode 20a is usually formed under the reflective pixel electrode and the reflective pixel electrode 20b is usually formed over the transparent pixel electrode 20a, much like the transparent and reflective pixel electrodes 19a and 19b of FIG. 3. Also, the reflective pixel electrode 20b is divided into a transmitting portion "A", i.e., usually a hole, and a reflective portion "C", which is much different from the reflective pixel electrode 19b of FIG. 3. The reflective electrode 20b of FIG. 5 contacts the drain electrode 65 through a second contact hole 73, and is electrically communicated with the drain electrode 65. Namely, the array substrate depicted in FIG. 5 has two differently positioned contact holes 72 and 73 in different places over the drain electrode 65. Thus, both the transparent pixel electrode 20a and the reflective pixel electrode 20b respectively contact the drain electrode 65.

FIG. 6 is a cross sectional view taken along the lines VI-VI and VII-VII of the LCD device of FIG. 5 and illustrates layer elements of the array substrate for use in another conventional transflective LCD device. The manufacturing process of the array substrate of FIG. 5 will be briefly explained hereinafter.

However, since the manufacturing process is similar to that of array substrate of FIG. 4, some explanations for the manufacturing steps are omitted.

The first to fourth manufacturing steps of the array substrate depicted in FIG. 6 are basically the same as those of the array substrate depicted in FIG. 4. Therefore, the manufacturing process of the array substrate depicted in FIG. 6 will be explained beginning from the fifth manufacturing step.

In the fifth manufacturing step, a transparent conductive material such as indium-tin-oxide (ITO) or indium-zinc-oxide (IZO) is deposited and then patterned on the first passivation layer 28 having the first contact hole 72 that is formed in an inner part of the drain electrode 65 during the fourth manufacturing step to form the transparent pixel electrode 20a. At this time, the transparent pixel electrode 20a has a protrusion that overlaps the drain electrode 65 as shown in FIG. 5. Thus, the protrusion of the transparent pixel electrode 20a contacts the portion of the drain electrode 65 through the first contact hole 72, and the transparent pixel electrode 20a is electrically communicated with the drain electrode 65.

In the sixth manufacturing step, the second passivation layer 69 is deposited on the first passivation layer 28 to cover the transparent pixel electrode 20a, and then patterned to form a second contact hole 73 in an outer part of the drain electrode 65. When forming the second contact hole 73, the first 28 and second 69 passivation layers are simultaneously etched. Thus, the second contact hole 73 penetrates the first 28 and second 69 passivation layers and exposes an outer portion of the drain electrode 65. In contrast to the patterning process of forming the second contact hole 73 in the array substrate depicted in FIG. 4, a photo mask used for forming the second contact hole 71 is not the same mask used for forming the first contact hole 72 because the first 72 and second 73 contact holes are formed in different locations above the drain electrode 65.

In the seventh manufacturing step, the reflective pixel electrode 20b is formed by depositing and patterning a reflective conductive material such as aluminum (Al) or Al-alloy (for example, AlNB) on the second passivation layer 69 having the second contact hole 73, much like the reflective pixel electrode 19b of FIG. 4. In the array substrate of FIG. 6, the reflective pixel electrode 20b, however, directly contacts the drain electrode 65 through the second contact hole 73, thereby being electrically connected with the drain electrode 65. When patterning the reflective conductive material, the transmitting portion "A" (i.e., the hole) is formed at a nearly central portion of the pixel region.

As described in FIGS. 5 and 6, the array substrate has two differently-placed contact holes 72 and 73 that connect the transparent pixel electrode 20a and reflective pixel electrode 20b to the drain electrode 65, respectively. As a result, the same photo mask can not be used for forming the first 72 and second 73 contact holes. Accordingly, an additional photo mask is required when forming the first or second contact hole 72 or 73.

SUMMARY OF THE INVENTION

Accordingly, the present invention is directed to an array substrate for use in a transflective liquid crystal display device that substantially obviates one or more of the problems due to limitations and disadvantages of the related art.

An object of the present invention is to provide an array substrate having contact holes formed in the same place to facilitate connection of a pixel electrode to a drain electrode.

Another object of the present invention is to provide an array substrate with reduced contact resistance in the interface between a transparent pixel electrode and a reflective pixel electrode.

Additional features and advantages of the invention will be set forth in the description which follows, and in part will be apparent from that description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device having a plurality of thin film transistor switching elements on a substrate, each switching element including a gate electrode, a source electrode and a drain electrode, the array substrate including: at least one switching element having at least a drain electrode; a first passivation layer formed over the switching element, the first passivation layer defining a drain contact hole exposing a first portion the drain electrode; a transparent pixel electrode contacting the drain electrode through the drain contact hole and defining a contact opening that exposes a second portion of the drain electrode, the contact opening being defined in a portion of the transparent pixel electrode in the drain contact hole; and a reflective pixel electrode contacting the transparent pixel electrode in the drain contact hole and contacting the drain electrode through the contact opening.

To achieve these and other advantages and in accordance with the purpose of the present invention, as embodied and broadly described, a transflective liquid crystal display device having a plurality of thin film transistor switching elements on a substrate, each switching element including a gate electrode, a source electrode and a drain electrode, the array substrate including: at least one switching element having at least a drain electrode; a first passivation layer formed over the switching element, the first passivation layer defining a first drain contact hole exposing a first portion the drain electrode; a transparent pixel electrode contacting the drain electrode through the first drain contact hole and defining a contact opening that exposes a second portion of the drain electrode, the contact opening being defined in a portion of the transparent pixel electrode in the first drain contact hole; a second passivation layer covering at least a portion of the transparent pixel electrode, the second passivation layer having a second drain contact hole formed over the first drain contact hole, wherein the second drain contact hole exposes a portion of the transparent pixel electrode in the first drain contact hole and also exposes the second portion of the drain electrode via the contact opening; and a reflective pixel electrode contacting the transparent pixel electrode in the second drain contact hole and contacting the drain electrode through the contact opening.

In another aspect of the present invention, a method of fabricating a transflective liquid crystal display device includes the steps of: forming a plurality of gate lines and a plurality of gate electrodes on a substrate; forming a gate insulation layer on the substrate to cover the plurality of gate lines and the plurality of gate electrodes; forming an active layer on the gate insulating layer; forming an ohmic contact layer on the active layer; forming a plurality of data lines on the gate insulation layer, each data line is perpendicular to the plurality of gate lines; forming source and drain electrodes with the data lines on the active layer and over each gate electrode, the source and drain electrodes being spaced apart from each other; forming a first passivation layer on the gate insulation layer to cover the data lines and the source and drain electrodes; forming a first drain contact hole in the first passivation layer to expose a first portion of the drain electrode; forming a transparent pixel electrode on the first passivation layer; forming a contact opening in the first drain contact hole, the transparent pixel electrode contacting the first portion of the drain electrode through the first drain contact hole; forming a second passivation layer on the first passivation layer to cover the transparent pixel electrode; forming a second drain contact hole in the second passivation layer over the first drain contact hole; forming a reflective conductive material on the second passivation layer having the second drain contact hole; forming a reflective pixel electrode from the reflective conductive material; and forming a transmitting hole, wherein the reflective pixel electrode contacts the transparent pixel electrode through the second drain contact hole and contacts the drain electrode through the contact opening.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, examples of which are illustrated in the accompanying drawings.

Figure 7:
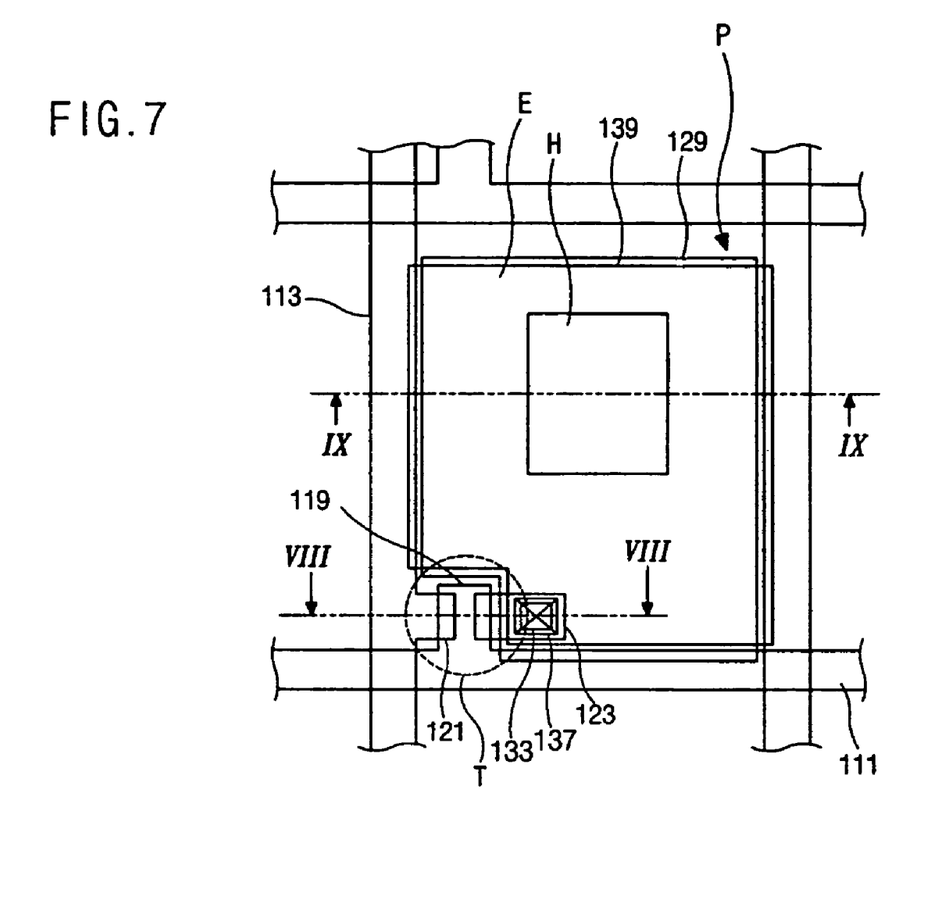
FIG. 7 is a plan view illustrating one pixel of an array substrate for a transflective liquid crystal display device according to an exemplary embodiment of the present invention.

FIG. 7 is a plan view illustrating one pixel of an array substrate for a transflective liquid crystal display device according to an exemplary embodiment of the present invention. As shown, gate lines 111 are arranged in a transverse direction, and data lines 113 are arranged in a longitudinal direction perpendicular to the gate lines 111. A thin film transistor (TFT) "T" is arranged at the crossing of the gate lines 111 and data lines 113. The TFT includes a gate electrode 119, a source electrode 121 and a drain electrode 123. The gate electrode 119 extends from the gate line 111, and the source electrode 121 extends from the data line 113 with the drain electrode 123 being spaced apart from the source electrode 121. A transparent pixel electrode 129 and a reflective pixel electrode 139 are arranged in a pixel region "P" that is defined by the gate lines 111 and data lines 113. The transparent pixel electrode 129 includes a transparent conductive material such as indium-tin-oxide (ITO) or indium-zinc-oxide (IZO), while the reflective pixel electrode 139 includes a reflective conductive material such as aluminum (Al) or an Al-alloy (for example, aluminum niobium, AlNb). The transparent pixel electrode 129 may be formed under the reflective pixel electrode 139 contacting the drain electrode 123 through a first drain contact hole 133. The reflective pixel electrode 139 formed over the transparent pixel electrode 129 is divided into a transmitting portion "H" (i.e., usually a hole) and a reflective portion "E." The reflective pixel electrode 139 contacts the transparent pixel electrode 129 through a second drain contact hole 137. In addition, the reflective pixel electrode 139 directly contacts the drain electrode 123 through a contact opening explained hereinafter, thereby being electrically communicated with the drain electrode 123.

FIGS. 8A to 8F are cross sectional views taken along lines VIII-VIII and IX-IX of FIG. 7 to illustrate the manufacturing process of the array substrate.

Figure 8A:
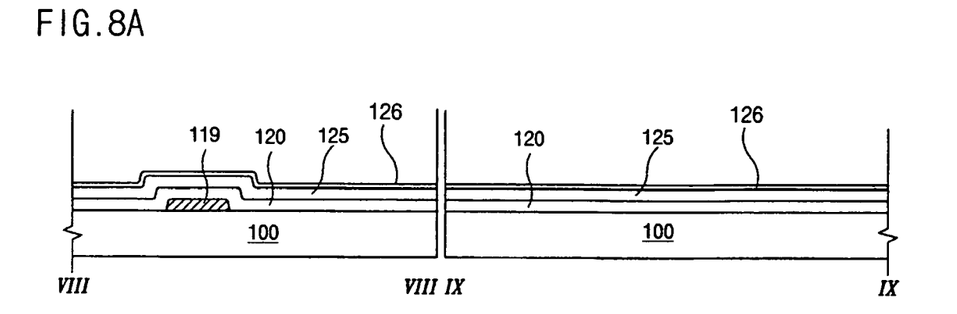
FIGS. 8A to 8F are cross sectional views taken along lines VIII-VIII and IX-IX of FIG. 7 and illustrate the manufacturing process of the array substrate.

Referring to FIG. 8A, the gate line 111 (see FIG. 7) is formed on a substrate 100 by depositing and patterning a conductive metal having low electrical resistance, such as molybdenum (Mo), tungsten (W) or aluminum (Al). The gate electrode 119 extends from the gate line 111 and is formed together with the gate line 111 on the substrate 100. After that, a gate insulation layer 120 is formed on entire surface of the substrate 100 to cover the conductive layers previously formed. The gate insulation layer 120 may be an inorganic substance, such as silicon nitride ($SiN_x$) or silicon oxide ($SiO_2$), or an organic substance, such as BCB (benzocyclobutene) or acryl-based resin. Subsequently, an amorphous silicon (a-Si) layer 125 and an impurity-doped amorphous silicon ($n^+/p^+$a-Si) layer 126 are formed in series on the gate insulation layer 120.

Figure 8B:
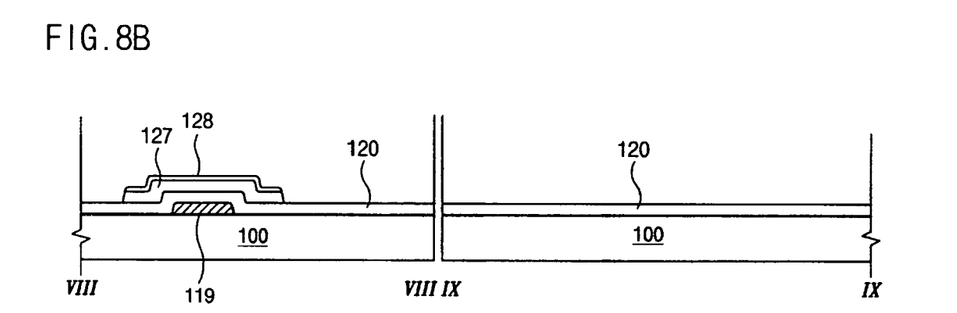

Now, referring to FIG. 8B, the amorphous silicon layer 125 and impurity-doped amorphous silicon layer 126 of FIG. 8A are simultaneously patterned to form an active layer 127 and an ohmic contact layer 128, respectively. The active layer 127 is formed on the gate insulation layer 120, particularly over the gate electrode 119 and the ohmic contact layer 128 is formed on the active layer 127. Thus, the ohmic contact layer 128 is interposed between the active layer 127 and the source and drain electrodes formed in a later step.

Figure 8C:
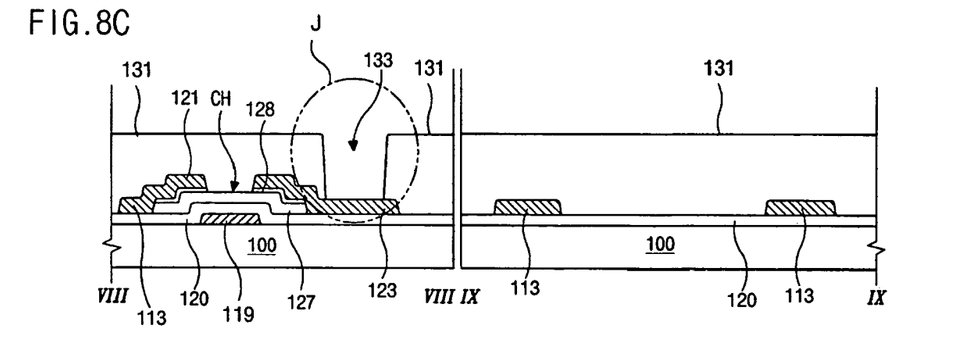

Then, referring to FIG. 8C, source electrode 121 and drain electrode 123 are formed on the ohmic contact layer 128 of a conductive metallic material selected from a group consisting of chromium (Cr), aluminum (Al), aluminum alloy (Al alloy), molybdenum (Mo), tantalum (Ta), tungsten (W), and antimony (Sb), and the like or combinations thereof. By depositing and patterning these materials, not only are the source electrode 121 and the drain electrode 123 formed, but the data line 113 is also formed on the gate insulation layer 120 such that the source electrode 121 extends from the data line 113. The source electrode 121 and the drain electrode 123 are spaced apart from each other and respectively overlap opposite ends of the gate electrode 119. Moreover, a portion of the ohmic contact layer 128 between the source electrode 121 and drain electrode 123 is eliminated to form a channel region "CH." Thereafter, a first passivation layer 131 is formed on and over the intermediates by depositing an organic substance such as BCB (benzocyclobutene) or an acryl-based resin. By patterning the first passivation layer 131, the first drain contact hole 133 that exposes a first portion of the drain electrode 133 is formed.

Figure 9A:
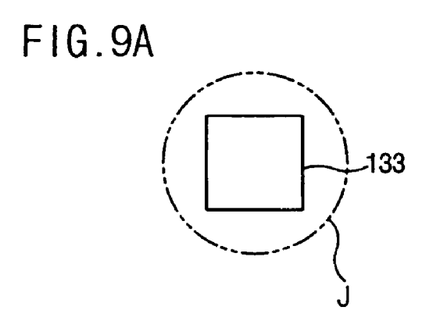
FIGS. 9A to 9D are enlarged plan views illustrating the manufacturing process of contact holes for the array substrate of FIG. 7.

FIG. 9A shows an enlarged plan view of a portion "J" of FIG. 8C. As shown, the first drain contact hole 133 has a quadrilateral shape such as rectangular or square. However, the shape of the drain contact hole 133 can be a circle or an oval. Further, the size of the first drain contact hole 133 is larger than that of the conventional art.

Figure 8D:
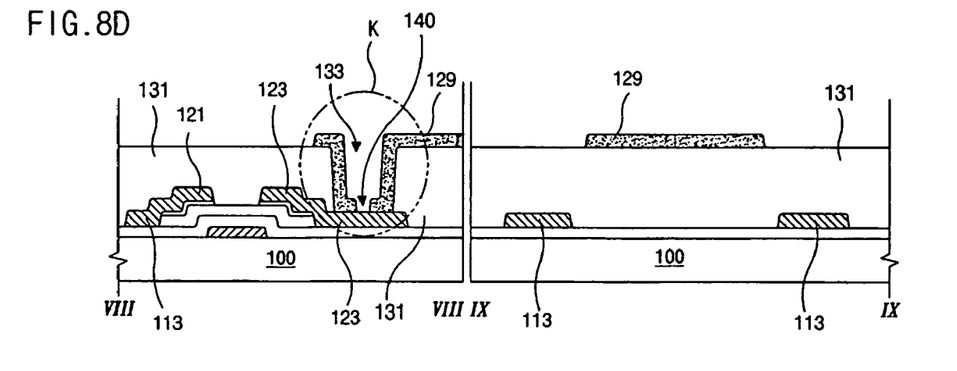
Figure 9B:
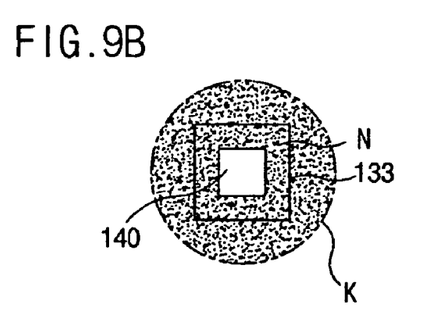

Next, referring FIG. 8D, a transparent conductive material, such as indium tin oxide (ITO) or indium zinc oxide (IZO), is deposited and then patterned to form the transparent pixel electrodes 129. After patterning the transparent conductive material, the transparent pixel electrode 129 is arranged in the pixel region "P" of FIG. 7. Moreover, referring back to FIG. 7, a bottom portion of the transparent pixel electrode 129 overlaps a portion of the gate line 111 as well as a portion of the drain electrode 123. Accordingly, the transparent pixel electrode 129 contacts the drain electrode 123 through the first drain contact hole 133. Further, when patterning the transparent conductive material, a contact opening 140, which penetrates the transparent pixel electrode 129 and exposes a second portion of the drain electrode 123, is formed in the central portion of the first drain contact hole 133 as shown in FIGS. 8D and 9B. Namely, referring to FIG. 9B that is an enlarged plan view of a portion "K" of FIG. 8D, the transparent pixel electrode 129 composes a contact area "N" with the drain electrode 123 in the bottom of the first drain contact hole 133. Although the contact opening 140 is quadrilateral shaped like a rectangle or a square in FIG. 9B, it can be shaped like a circle or an oval.

Figure 8E:
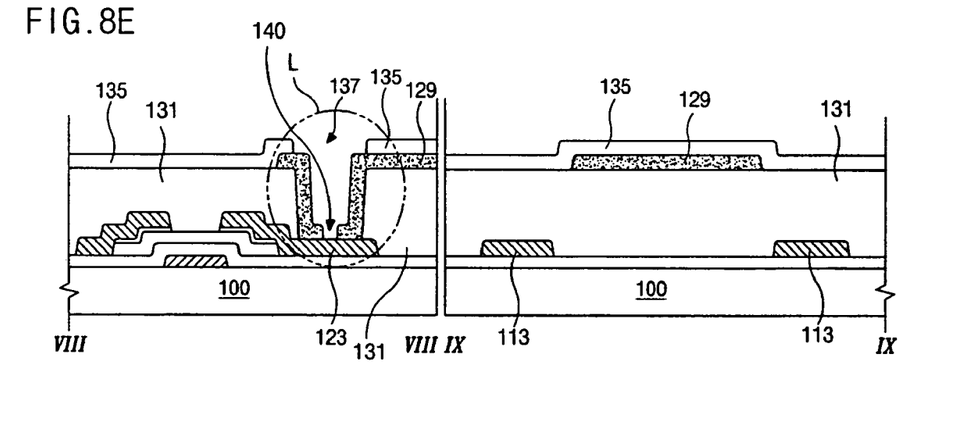

Referring to FIG. 8E, a second passivation layer 135 is deposited on the first passivation layer 131 to cover the transparent pixel electrode 129, and then patterned to form the second drain contact hole 137, particularly over the first drain contact hole 133 of FIG. 8D. The second drain contact hole 137 exposes a portion of the transparent pixel electrode 129 in the first drain contact hole 133, particularly over the drain electrode 123. Accordingly, the second drain contact hole 137 and the contact opening 140 expose a portion of the drain electrode 123.

Figure 9C:
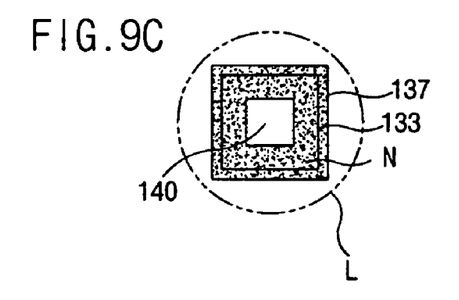

FIG. 9C shows an enlarged plan view of a portion "L" of FIG. 8E. As shown, the second passivation layer 135 is formed around the first drain contact hole 133 and the second drain contact hole 137 that are formed in the same place. As a result, a photo mask that is used for forming the first drain contact hole 133 can be used again for forming the second drain contact hole 137. Here, the second passivation layer 135 is an inorganic substance, such as silicon nitride (SiNx) or silicon oxide ($SiO_2$), or an organic substance, such as BCB (benzocyclobutene) or an acryl-based resin. Further, although the second drain contact hole 137 is quadrilateral shaped like a rectangle or a square in FIG. 9C, it can be shaped like an oval or a circle.

Figure 8F:
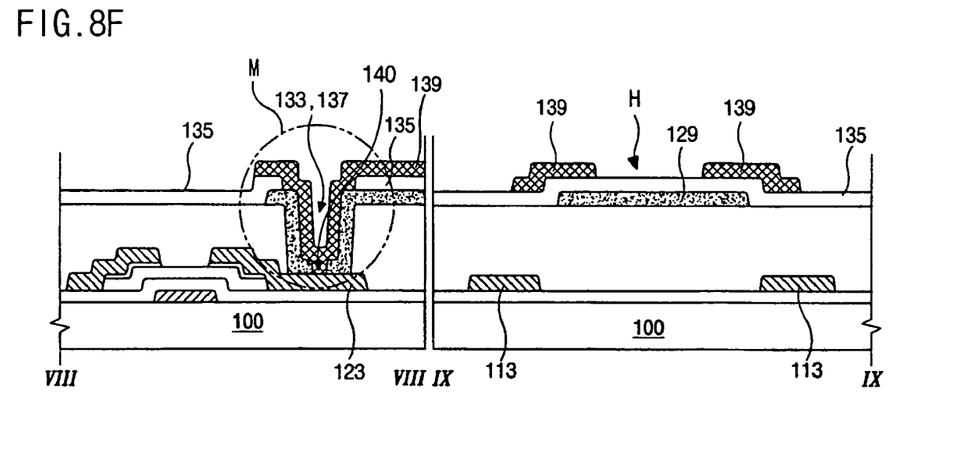

Now, referring to FIG. 8F, on the second passivation layer 135 having the second contact hole 137, the reflective pixel electrode 139 is formed by depositing and patterning a reflective conductive material that has low resistance and high light reflectivity, such as aluminum (Al) or an Al-alloy (for example, aluminum niobium, AlNb). The reflective pixel electrode 139 is arranged in the pixel region "P" of FIG. 7 and over the transparent pixel electrode 129. Accordingly, the reflective pixel electrode 139 contacts not only the transparent pixel electrode 129 through the second contact hole 137 but also the drain electrode 123 through the contact opening 140, thereby being electrically connected with the transparent pixel electrode 129 and drain electrode 123. When patterning the reflective conductive material, the transmitting portion "H" (i.e., the hole) is formed at a nearly central portion of the pixel region.

Figure 9D:
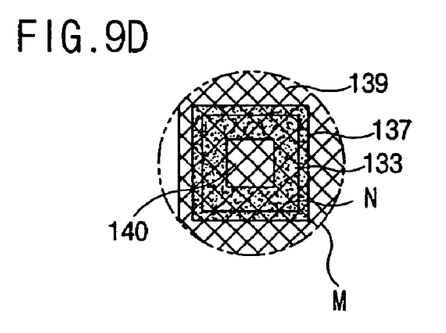

Referring to FIG. 9D that is an enlarged plan view of a portion "M" of FIG. 8F, the reflective pixel electrode 139 covers the first drain contact hole 133 and the second drain contact hole 137 and the contact opening 140. Namely, the reflective pixel electrode 139 directly contacts the drain electrode 123 through the contact opening 140.

As described above, according to the present invention, the transparent pixel electrode contacts the drain electrode through the first drain contact hole. Moreover, the reflective pixel electrode directly contacts not only the transparent pixel electrode but also the drain electrode through the second drain contact hole and contact opening. Moreover, the first and second contact holes are formed in the same position, and the reflective pixel electrode can directly contact the drain electrode. As a result, the photo mask that is used for forming the first drain contact hole can also be used for forming the second drain contact hole. The cost of fabricating the array substrate for use in the transflective LCD device is reduced. Further, although the oxidized layer (aluminum oxide: $Al_2O_3$) is formed in the interface between the transparent pixel electrode and the reflective pixel electrode, the contact resistance is reduced because the reflective pixel electrode directly contacts the drain electrode. As a result, the present invention achieves increased yield and improved operating characteristics of the transflective LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
   a switching element on a substrate, the switching element including a gate electrode connected to a gate line, a source electrode connected to a data line, and a drain electrode, the data line and the source and drain electrodes are formed of the same metal;
   a first passivation layer formed over the switching element, the first passivation layer defining a drain electrode contact hole exposing a first portion the metal drain electrode;
   a transparent pixel electrode contacting the metal drain electrode through the drain electrode contact hole and defining a contact opening that exposes a second portion of the metal drain electrode, the contact opening being defined in a portion of the transparent pixel electrode in the drain electrode contact hole; and
   a reflective pixel electrode overlapping peripheries of the transparent pixel electrode, the reflective pixel electrode contacting the transparent pixel electrode in the drain electrode contact hole and contacting the metal drain electrode through the contact opening.

2. The transflective liquid crystal display device according to claim 1, wherein the transparent pixel electrode is formed in a pixel region that is defined by pairs of gate lines and data lines.

3. The transflective liquid crystal display device according to claim 1, wherein the second portion of the metal drain electrode is within the first portion of the metal drain electrode.

4. The transflective liquid crystal display device according to claim 1, wherein the reflective electrode includes at least one of aluminum (Al) and an aluminum alloy (Al-alloy).

5. The transflective liquid crystal display device according to claim 4, wherein the aluminum alloy includes aluminum niobium (AlNb).

6. The transflective liquid crystal display device according to claim 1, wherein the drain electrode contact hole and the contact opening have a quadrilateral shape.

7. The transflective liquid crystal display device according to claim 6, wherein the quadrilateral shape is one of rectangular and square.

8. The transflective liquid crystal display device according to claim 1, wherein the drain electrode contact hole and the contact openings have a circular shape.

9. The transflective liquid crystal display device according to claim 1, wherein the drain electrode contact hole and the contact openings are oval shaped.

10. A transflective liquid crystal display device, comprising:
a switching element on a substrate, the switching element including a gate electrode connected to a gate line, a source electrode connected to a data line, and a drain electrode, the data line and the source and drain electrodes are formed of the same metal;
a first passivation layer formed over the switching element, the first passivation layer defining a first drain electrode contact hole exposing a first portion the metal drain electrode;
a transparent pixel electrode contacting the metal drain electrode through the first drain electrode contact hole and defining a contact opening that exposes a second portion of the metal drain electrode, the contact opening being defined in a portion of the transparent pixel electrode in the first drain electrode contact hole;
a second passivation layer covering at least a portion of the transparent pixel electrode, the second passivation layer having a second drain electrode contact hole formed over the first drain electrode contact hole, wherein the second drain electrode contact hole exposes a portion of the transparent pixel electrode in the first drain electrode contact hole and also exposes the second portion of the metal drain electrode via the contact opening; and
a reflective pixel electrode overlapping peripheries of the transparent pixel electrode, the reflective pixel electrode contacting the transparent pixel electrode in the second drain electrode contact hole and contacting the metal drain electrode through the contact opening.

11. The transflective liquid crystal display device according to claim 10, wherein the transparent pixel electrode is formed in a pixel region that is defined by pairs of gate lines and data lines.

12. The transflective liquid crystal display device according to claim 10, wherein the reflective pixel electrode is formed on the second passivation layer.

13. The transflective liquid crystal display device according to claim 10, wherein the second portion of the metal drain electrode is within the first portion of the metal drain electrode.

14. The transflective liquid crystal display device according to claim 10, wherein the reflective electrode includes at least one of aluminum (Al) and an aluminum alloy (Al-alloy).

15. The transflective liquid crystal display device according to claim 14, wherein the aluminum alloy includes aluminum niobium (AlNb).

16. The transflective liquid crystal display device according to claim 10, wherein the first drain electrode contact hole, the second drain electrode contact hole, and the contact opening have a quadrilateral shape.

17. The transflective liquid crystal display device according to claim 16, wherein the quadrilateral shape is one of rectangular and square.

18. The transflective liquid crystal display device according to claim 10, wherein the first drain electrode contact hole, the second drain electrode contact hole, and the contact openings have a circular shape.

19. The transflective liquid crystal display device according to claim 10, wherein the first drain electrode contact hole, the second drain electrode contact hole, and the contact openings are oval shaped.

20. A method of fabricating a transflective liquid crystal display device, comprising the steps of:
forming a plurality of gate lines and a plurality of gate electrodes on a substrate;
forming a gate insulation layer on the substrate to cover the plurality of gate lines and the plurality of gate electrodes;
forming an active layer on the gate insulation layer;
forming an ohmic contact layer on the active layer;
forming a plurality of data lines on the gate insulation layer, each data line is perpendicular to the plurality of gate lines;
forming source and drain electrodes with the data lines on the active layer and over each gate electrode, the source and drain electrodes being spaced apart from each other, the data line and the source and drain electrodes include the same metal;
forming a first passivation layer on the gate insulation layer to cover the data lines and the metal source and drain electrodes;
forming a first drain electrode contact hole in the first passivation layer to expose a first portion of the metal drain electrode;
forming a transparent pixel electrode on the first passivation layer, the transparent pixel electrode contacting the first portion of the metal drain electrode through the first drain electrode contact hole;
forming a contact opening in the transparent pixel electrode;
forming a second passivation layer on the first passivation layer to cover the transparent pixel electrode having the contact opening;
forming a second drain contact hole in the second passivation layer over the first drain electrode contact hole;
forming a reflective conductive material on the second passivation layer having the second drain electrode contact hole;
forming a reflective pixel electrode from the reflective conductive material, the reflective pixel electrode overlapping peripheries of the transparent pixel electrode, contacting the transparent electrode in the second drain electrode contact hole and contacting the metal drain electrode through the contact opening, the reflective pixel electrode having a transmitting section in a central portion of the pixel region.

21. The method according to claim 20, wherein the first passivation layer includes at least one of benzocyclobutene (BCB) and an acryl-based resin.

22. The method according to claim 20, wherein the reflective conductive material includes at least one of aluminum (Al) and an aluminum alloy (Al-alloy).

23. The method according to claim 22, wherein the aluminum alloy includes aluminum niobium (AlNb).

24. The method according to claim 20, wherein the first drain electrode contact hole, the second drain electrode contact hole, and the contact opening have a quadrilateral shape.

25. The method according to claim 24, wherein the quadrilateral shape is one of a rectangle and a square.

26. The method according to claim 20, wherein the first drain electrode contact hole, the second drain electrode contact hole, and the contact opening are shaped like a circle.

27. The method according to claim 20, wherein the first drain electrode contact hole, the second drain electrode contact hole and the contact opening are shaped like an oval.

* * * * *